April 28, 1953 — A. G. WOOD ET AL — 2,636,434
CROWN MARKING APPARATUS
Filed Nov. 5, 1947 — 5 Sheets-Sheet 1

INVENTORS
A. G. Wood,
C. J. Laval,
J. Callaghan,
E. A. Wahl,
M. A. Greulich,
W. Boehl,
BY
ATTORNEY Patented Apr. 28, 1953

2,636,434

UNITED STATES PATENT OFFICE 2,636,434

CROWN MARKING APPARATUS

Alfred G. Wood, Ramsey, Charles J. Laval, Tenafly, and John Callaghan, Laurelton, N. J., and Eugene A. Wahl, Garden City, N. Y., and Max A. Greulich, Belleville, and Wilhelm Boehl, Union, N. J., assignors to P. Ballantine & Sons, Newark, N. J., a corporation of New Jersey Application November 5, 1947, Serial No. 784,256

13 Claims. (Cl. 101—44)

1

This invention relates to a container-cap marking mechanism of the general type disclosed in Lehman, et al. Patent No. 2,313,828, dated March 16, 1943, and has generally in view to provide a cap marking mechanism to accomplish the same general purposes as are set forth in said patent; i. e., to mark caps so that the particular machine which filled and capped any given bottle or can, and the particular operator of the machine when the given bottle or can was filled and capped, may subsequently readily be identified.

More particularly, one special and important object of the present invention is to provide a cap marking mechanism which is effective to mark caps so as not only to enable ready identification of the particular machine which filled and capped any given bottle or can, and the operator of the machine at the time the given bottle or can was filled and capped, but to indicate the date or the approximate date when the filling and capping of the given bottle or can occurred.

Another special and important object of the present invention is to provide a cap marking mechanism which advantageously employs cams as the actuating means for the cap marking elements thereof in lieu of toothed elements such as racks and pinions which may become fouled after more or less use and which require periodic cleaning.

Another special and important object of the present invention is to provide a cap marking mechanism embodying simple, practical means for controlling advance of caps through the cap chute of a bottle or can capping machine with which the mechanism is associated.

Another special and important object of the present invention is to provide a mechanism embodying simple, practical means for marking caps to indicate the approximate date when a given bottle or can was capped.

With the foregoing and other objects in view, which will become more fully apparent as the nature of the invention is better understood, the same consists in a cap marking mechanism embodying the novel features of construction, combination and arrangement of parts and mode of operation, as will be hereinafter more fully described, illustrated in the accompanying drawings and defined in the appended claims.

In the accompanying drawings, wherein like characters of reference denote corresponding parts in the different views:

2

Figure 3 is a central, vertical section on an enlarged scale through the cap marking mechanism showing the status of the parts thereof during marking of a cap.

Referring to the drawings in detail, A designates, generally, a machine of a well known type for applying closure caps to bottles or cans, and B designates, generally, the present mechanism for marking the caps applied by the machine A.

The capping machine A includes, as usual, an annular series of capping heads 10 which are intermittently rotatable as a unit to bring the heads successively to a cap-applying position or station; a hopper 11 to contain the caps to be applied to the bottles or cans which are understood to be fed successively to the capping heads by means with which the present invention is not concerned and which therefore are not illustrated; and a chute 12 through which the caps gravitate from the hopper 11 to the position or station where they are applied by the capping heads 10 to the bottles or cans.

The capping machine A additionally includes, of course, cooperating parts whereby the capping heads 10 perform their function of applying caps to bottles or cans, but as the present invention is not concerned with the details of said machine, the same is illustrated only conventionally in order to illustrate the application thereto of the present cap marking mechanism. Moreover, it will be understood that the capping machine illustrated is only one of a number of specifically different capping machines with which the present marking mechanism may be used.

Referring now in detail to the present cap marking mechanism B, it will be observed that the same includes a sturdy bracket 13 which is suitably fastened rigidly to the capping machine A and which itself includes a pair of arms 14, 14 disposed, respectively, at opposite sides of the cap chute 12.

To the arms 14, 14 is rigidly secured, as by means of screws 15, a supporting base 16 for a housing 17 which contains the operating parts of the present cap marking mechanism.

The base 16 is provided at one side with a pair of vertically spaced apart lugs 18, 18, and the housing 17 is provided at its corresponding side with a pair of vertically spaced lugs 19, 19 which are disposed between the lugs 18. One pair of said lugs is provided with hinge pins 20 and the other pair of said lugs is provided with openings 21 in which said hinge pins are disposed. The housing 17 thus is mounted upon the base 16 for swinging movement between an operative position in which it is disposed in front of the cap chute 12, and an inoperative position in which it is disposed well outwardly of and to one side of said cap chute for ready access to both the cap chute and said housing for inspection, repair or other purposes.

Extending loosely through suitable side portions 22 of the housing 17 to be threaded into openings provided in suitable portions 23 of the base 16, are clamp screws 24 for clamping said housing, when in its operative position, rigidly to said base. In this connection, the rear face of said housing is designed to abut the front face of the cap chute 12 to insure a proper cooperative relationship between said housing and said cap chute, and in order to permit said housing to be drawn by the clamp screws 24 rearwardly against said cap chute, the openings 21 which accommodate the hinge pins 20 are forwardly and rearwardly elongated. Further in this connection, the base 16 is provided with a portion 25 which is disposed behind the cap chute 12 to constitute an abutment to support the cap chute against rearward deflection by the housing 17 when the latter is drawn rearwardly against the front of said cap chute by the clamp screws 24. In the base portion 25 may be threaded studs 26 for engagement with the rear of the cap chute 12 to constitute the actual support for the latter and to adapt the mechanism for use in association with cap chutes of varying thicknesses, as well as to insure a proper adjustment of any given cap chute relative to the base 16.

Figure 1:
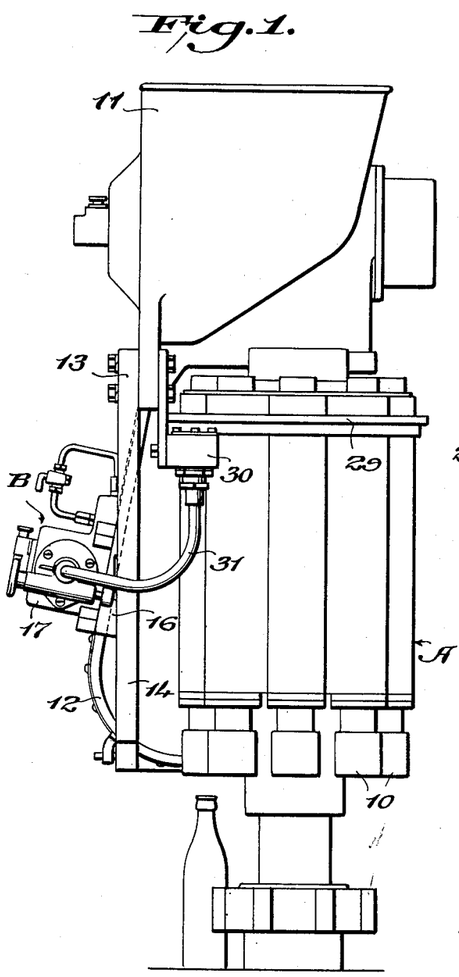
Figure 1 is a side elevation of a bottle capping machine showing the present cap marking mechanism operatively applied thereto.
Figure 2:
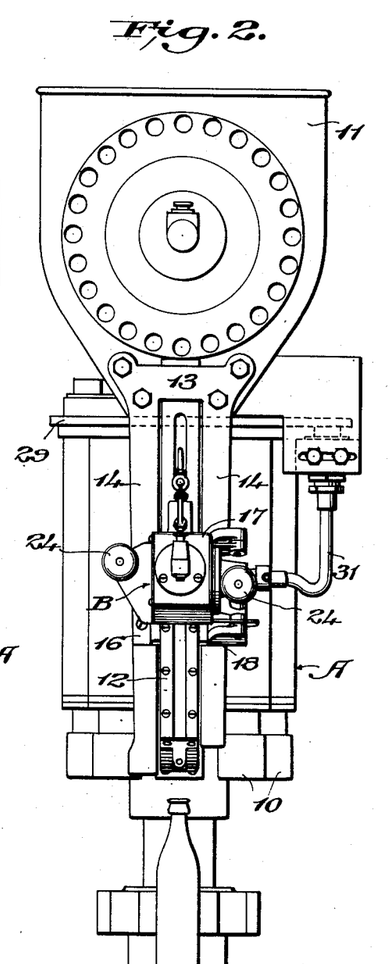
Figure 2 is a front elevation of the bottle capping machine and the cap marking mechanism shown in Fig. 1.
Figure 4:
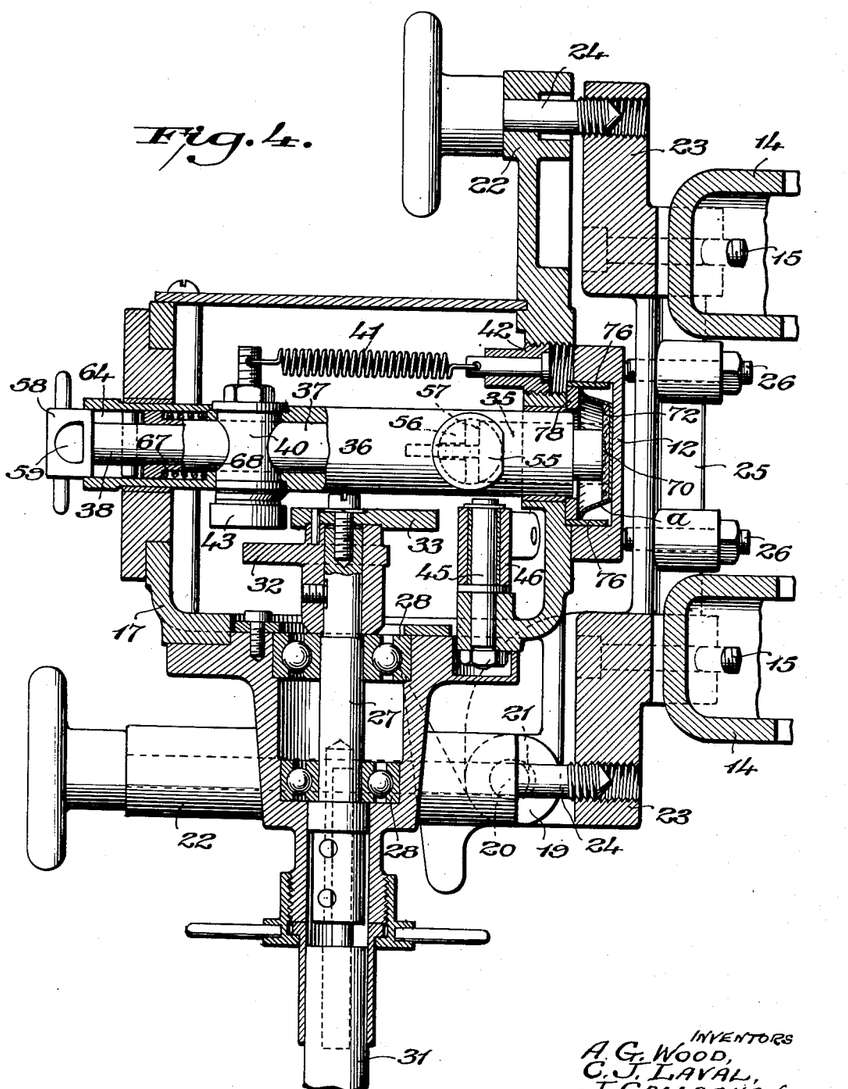
Figure 4 is a central, horizontal section through the cap marking mechanism.
Figures 5, 9, 10:
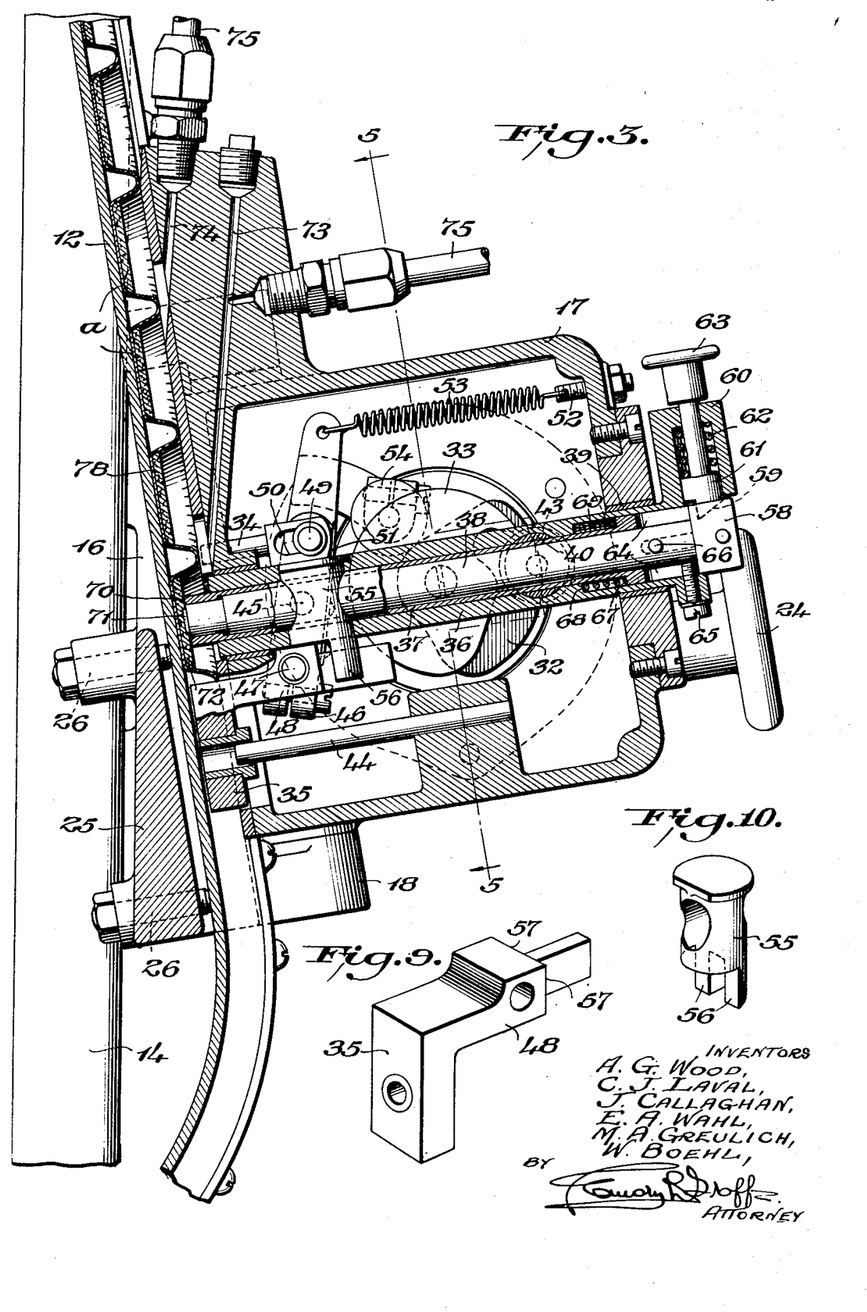
Figure 5 is a transverse section on the line 5—5 of Fig. 3.
Figure 9 is a perspective view of a shoe constituting a part of the mechanism for controlling feeding of the caps and for supporting the caps in a position to be marked.
Figure 10 is a perspective view of a pin for cooperation with the shoe shown in Fig. 9 to render the mechanism inoperative to repeatedly mark a cap in the event of stoppage of feeding of caps through the cap chute.
Figure 5:
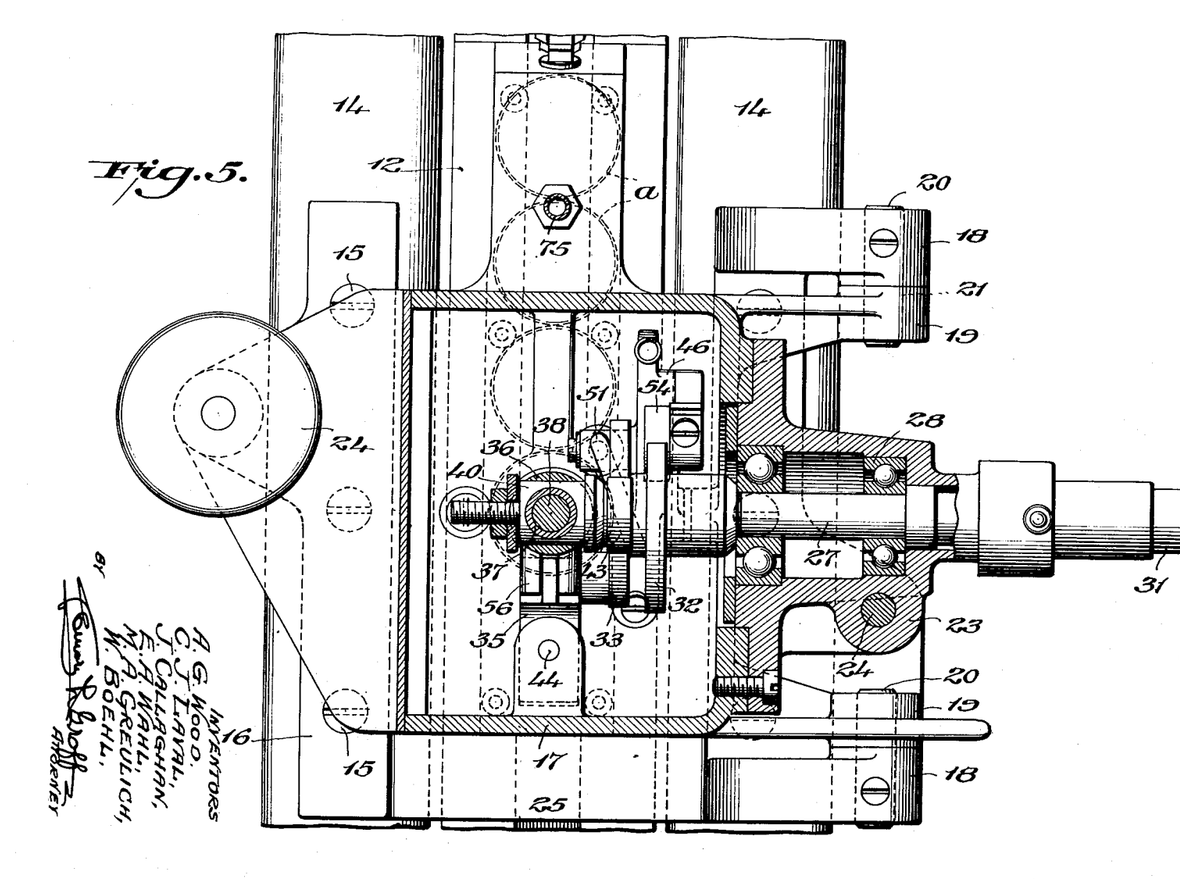
Figures 6, 7, 8:
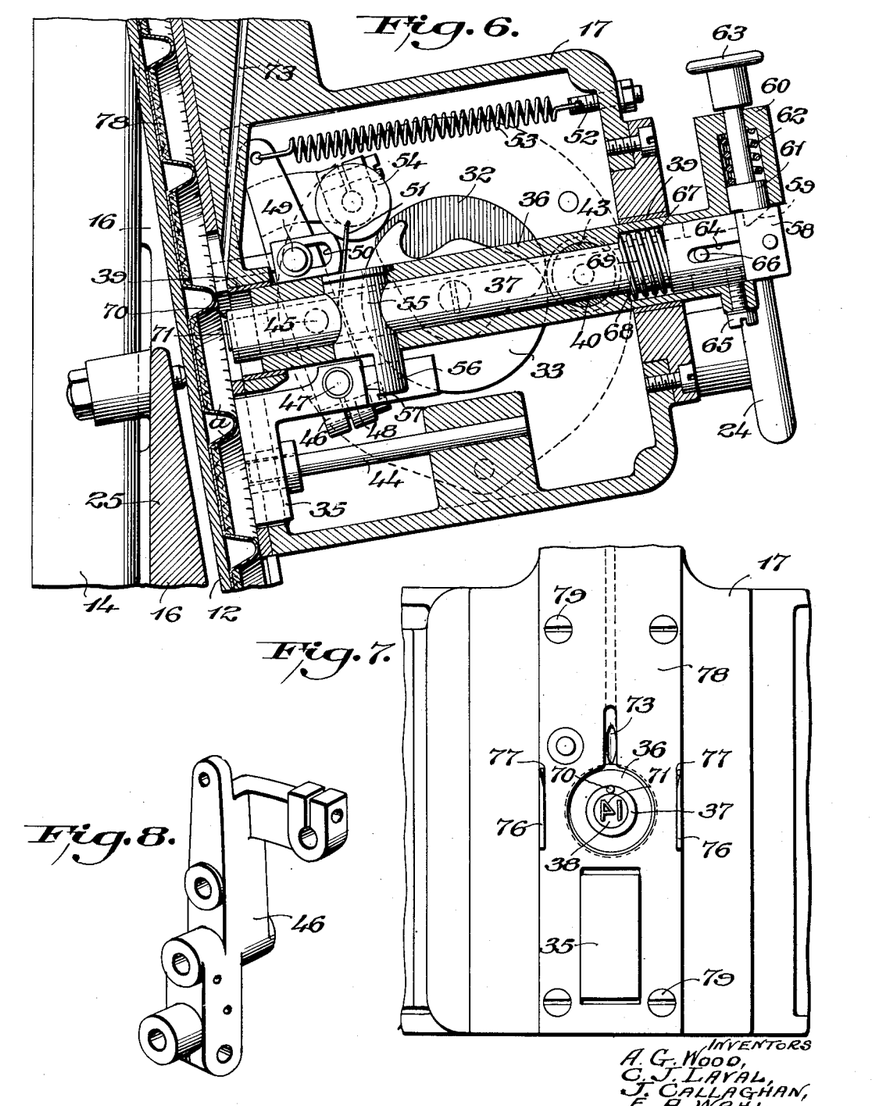
Figure 6 is a view similar to Fig. 3 showing the status of the parts of the mechanism when a stoppage occurs in the cap feed chute of the bottle capping machine preventing normal operation of the cap marking mechanism.
Figure 7 is a fragmentary rear elevation of the cap marking mechanism.
Figure 8 is a perspective view of a rocker arm constituting a part of the mechanism for controlling feeding of the caps through the cap chute of the bottle capping machine.

Extending into the housing 17 through one of the side walls thereof is a horizontal drive shaft 27 which is journaled for rotation in suitable bearings 28 suitably supported by said side wall and which may be driven in any suitable manner, as, for example, by means of an electric motor suitably mounted and suitably connected therewith, or, as illustrated in Figs. 1 and 2 of the drawings, by means of a belt 29 driven by the capping machine A and operatively connected with said shaft through a suitable gearing 30 and a flexible shaft 31. In any event, on said shaft 27, within the housing 17, are suitably mounted two cams 32 and 33, the former for actuating a pin 34 and a shoe 35 for controlling feeding of caps through the cap chute 12, and the latter for controlling operation of a tubular holder 36 for a pair of punches 37 and 38 for marking the caps as they are fed through the cap chute 12.

The punch holder 36 is disposed horizontally, or substantially horizontally, extends forwardly and rearwardly relative to the housing 17 at right angles to the cap chute 12, through openings in the front and rear walls of said housing, and is mounted in suitable bearings 39 for endwise or reciprocable movements. Near its rear end said holder is provided with a transverse pin 40, one end of which is connected by a contractile helical spring 41 with a screw 42 mounted in the rear wall of the housing 17. The screw 42 is adjustable to regulate the tension of said spring 41 and the latter tends constantly to urge the holder 36 rearwardly or toward the cap chute 12.

On the other end of the pin 40 is mounted a roller 43 which is disposed forwardly of the cam 33 for actuation by the latter to retract the holder 36. The cam 33 is shaped to retract the holder 36 a predetermined amount and then suddenly to release the same for projection by the spring 41.

The shoe 35 is disposed below the punch holder 36 and is suitably mounted as, for example, upon a guide rod 44 suitably carried by the housing 17, for forward and rearward movement. By forward and rearward movement of said shoe, its rear end portion is projectable and retractable through an opening in the rear wall of the housing 17 into and from the cap chute 12. When said shoe is projected the top of its rear end portion constitutes a stop to hold caps $a$ against gravitating through the cap chute 12, and in this connection the said top of the rear end portion of said shoe is disposed below the punch holder 36 a distance such that a cap $a$ resting edgewise upon said rear end portion is substantially axially alined with said punch holder 36.

Like the shoe 35, the pin 34 is suitably mounted for forward and rearward movement, and the same is disposed so that by forward and rearward movement thereof its rear end portion is projectable and retractable through an opening in the rear wall of the housing 17 into and from the cap chute 12. Said pin is laterally offset with respect to the center of the cap chute and is disposed a distance above the shoe 35 such that when it is projected its rear end portion enters the space between an upper side portion of a cap $a$ resting upon said shoe 35 and the lower side portion of the next upper cap.

Upon a horizontal pin 45 suitably mounted in the housing 17 is pivoted, at an intermediate point, a substantially vertically disposed rocker arm 46 which is located at one side of the punch holder 36 and at its lower end is suitably pivoted, as indicated at 47, to a rearward extension 48 of the shoe 35. Above its pivotal mounting 45 said rocker arm 46 carries a lateral pin 49 which extends through a longitudinally elongated slot 50 in the front end portion of the pin 34. Also carried by said rocker arm 46 is a leaf spring 51 which acts against the front end of the pin 34 so as to tend constantly to urge said pin rearwardly relative to said rocker arm to the limit of such movement as determined by the length of the slot 50 in said pin.

Connecting the upper end of the rocker arm 46 with a screw 52 mounted in the front wall of the housing 17 is a contractile helical spring 53 which tends constantly to rock said arm 46 in a direction to retract the pin 34 and to project the shoe 35, while carried by said rocker arm and disposed rearwardly of the cam 32 is a roller 54 which is engageable by said cam 32 to rock said rocker arm in the opposite direction; i. e., in a direction to retract the shoe 35 and to project the pin 34. The screw 52 is adjustable to regulate the tension of the spring 53.

On the lower end of a vertical pin 55 which extends through the punch holder 36, or otherwise suitably carried by and depending from said punch holder, is a pair of fingers 56 which straddle the rearward extension 48 of the shoe 35 and are engageable with forwardly facing shoulders 57 on said rearward extension to positively prevent rearward movement of the punch holder 36 by the spring 41 when said shoe 35 is retracted. Moreover, said fingers 56 cooperate with the said rearward extension 48 of the shoe 35 to hold the punch holder 31 against rotation.

The punch 37 extends through the tubular holder 36 and itself is of tubular form and has extending therethrough the punch 38 which is in the form of a rod. On the front end of the punch 38 is a head 58 which is disposed exteriorly of the housing 17 and provided at its top with a recess 59, while on the front end of the punch holder 36 is a vertically offset housing 60 in which is a latch bolt 61, the lower end of which is formed to cooperate with said recess 59 to latch said punch 38 against both rotation and longitudinal movement relative to said punch holder 36. A spring 62 urges the latch bolt 56 downwardly to maintain its lower end in the recess 59, and said latch bolt is provided with a suitable handle 63 whereby it may readily be lifted manually to release the punch 38 for withdrawal from the punch 37.

The front end of the punch 37 is provided with four or any other suitable number of radial slots or openings 64 which are spaced preferably equal angular distances apart, while in the front end portion of the punch holder 36 is threaded a screw 65 for engagement in any one of said slots or openings 64 to hold said punch 37 in predetermined angular relationship to said holder 36. The punch 38 has only a single operative angular position due to the cooperation of the latch bolt 61 with its recess 59. Additionally, the punches 37 and 38 may be held in desired angular relationship to each other by a transverse pin 66 carried by the punch 38 and engaged in one or a pair of the slots 64 of the punch 37.

The front end of the punch 37 abuts the rear face of the head 58 of the punch 38. Thereby said punch 37 is required to move rearwardly with the punch 38 and the punch holder 36, since said punch 38 is latched to said punch holder by the latch bolt 61. The punch 37 may be held with its front end engaging the rear face of the head 58 of the punch 38 in any suitable manner, as, for example, by direct engagement of a rearwardly facing shoulder 67 thereon with a forwardly facing shoulder 68 on the punch holder 36. In order, however, to permit ready engagement and disengagement of the latch bolt 61 with and from the recess 59 and, at the same time, to avoid undesirable looseness or play between the punch holder 36 and the punches 37 and 38, the shoulders 67 and 68 preferably are spaced apart and a suitable expansion spring 69 is interposed between them.

The punches 37 and 38 are of lengths such that their rear ends are disposed flush, or substantially flush, with each other, and are located rearwardly of the rear end of the punch holder 36, when the punch 38 is latched by the latch bolt 61 and the front end of the punch 37 abuts the rear face of the head 58 of the punch 38.

On the rear ends of the punches 37 and 38 are suitable raised characters 70 and 71, respectively, which are impressed in the central portion of the foil or other lining 72 of a cap $a$ disposed in the cap chute 12 in alinement with said punches when the punch holder 36 and, consequently, the punches 37 and 38 are released by the cam 33 and are projected rearwardly by the spring 41.

Each operator of any given machine is furnished with a punch 38 having a distinctive character 71, such, for example, as a numeral or number, and whenever any given operator takes charge of a machine he inserts his punch 38 in the punch 37, the prior operator of the machine having removed his punch 38 from the machine at the end of his tour of duty by the simple act of releasing the latch bolt 61 and withdrawing his punch 38 from the punch 37. Thus, the mark impressed by the punch 38 in the lining of the cap of any given bottle or can, is a clear indication that that particular bottle or can was capped by a certain machine in charge of a certain operator.

The relationship of the character, or characters, 70 of the punch 37 to the character, or characters, 71 of the punch 38 is indicative of the approximate date when any given cap was stamped by any given machine. For example, for a time period of one year, thirteen punches 37 may be provided, each for use during a period of four consecutive weeks. The punch 37 for use during the first four weeks of any year may have, for example, a single character 70 to form a mark such as a dot, and, to indicate the first week in the year, the punch 37 may be angularly related to the punch 38 so that the dot is applied, for example, above the mark formed by the character 71 of the punch 38. To indicate the second week in the year, the punch 37 may be angularly related to the punch 38 so that the dot is applied, for example, at the right hand side of the mark formed by the character 71. Similarly, to indicate the third week in the year the punch 37 may be angularly related to the punch 38 so that the dot is applied, for example, below the mark formed by the character 71, while to indicate the fourth week of the year the punch 37 may be angularly related to the punch 38 so that the dot is applied, for example, at the left hand side of the mark formed by the character 71. The punch 37 to cover the time period of the next four weeks in the year may be provided, for example, with a character to form a short vertical or a horizontal line, a pair of dots or the like. In other words, each punch 37 has a character, or characters, different from each other such punch to cover a period of four consecutive weeks, and the different angular relationships of each punch 37 to the punch 38, as determined by engagement of the screw 65 in the respective slots or openings 64 of each punch 37, may be employed to indicate the respective weeks of the four week period. Thus, use of any given punch 38 will result in a mark to indicate the particular machine which applied a given cap, and the operator of the machine when the cap was applied, while the use of any given punch 37 will result in a mark indicative of the week of the year when the cap was applied.

Of course, if more definite date marking of the caps should be desired, there may be used, for example, a different punch 38 for each period of four days, and the four different angular positions of the punch may be employed to indicate the separate days of the four day period. Alternatively, each punch 37 may have more than four different angular positions to correspondingly divide any given time period during which it is used. In fact, the combination of two punches, one angularly adjustable relative to the other, obviously is capable of many variations to accomplish the general purpose of applying to the caps a markings to indicate a particular machine which applied a given cap as well as the operator of the machine and the date, or the approximate date, when the cap was applied.

The operation of the mechanism is as follows: Caps a gravitate from the hopper through the cap chute 12 with their open ends facing forwardly. The cams 32 and 33 are driven in unison and the cam 32 and the spring 53 serve to rock the rocker arm 46 with the result that the pin 34 and the shoe 35 alternatively are projected into and retracted from the cap chute 12. When the shoe 35 is projected it halts descent of the caps and supports the lowermost of the caps thereabove in alinement with the punches 37 and 38, or, in other words, in a position to be marked by said punches. The cam 33 is related to the cam 32 to retract the punch holder 36 and the punches 37 and 38 during retraction of the pin 34 and projection of the shoe 35, and to release said punch holder and the punches 37 and 38 for projection by the spring 41 when the pin 34 has been retracted and the shoe 35 has been projected. The cap supported directly upon the shoe 35 thus is marked by the punches 37 and 38. Thereupon, the cam 33 acts to retract the punch holder 36 and the punches 37 and 38, and the cam 32 acts to rock the rocker arm 46 to project the pin 34 and to retract the shoe 35. The marked cap thus is released to gravitate through the chute 12 below the shoe 35 to the capping station of the capping head, while at the same time the projected pin 34 acts to hold the caps thereabove against downward movement. The spring 53 then acts to rock the rocker arm 46 to retract the pin 34 and to project the shoe 35, with the result that the caps above the pin move downwardly and the lowermost of the same comes to rest upon the shoe 35 in a position to be marked. Thereupon the cam 33 again releases the punch holder 31 and the punches 37 and 38 and the recounted operation is repeated, which continues as long as the shaft 27 is driven and there is no interference with feeding of the caps.

If, for any reason, a cap should become stopped or lodged in the cap chute 12 in a position to interfere with projection of the pin 34, the lost motion connection between said pin and the rocker arm 46 will permit said pin to remain retracted even though the cam 32 and the spring 53 may continue to act to rock said rocker arm. Thus, no harm will result to the cap or the marking mechanism due to the cap stoppage or lodgement.

If, because of an accumulation of caps in the cap chute 12 below the shoe 35, or if, for any other reasons, a cap should come to rest or become lodged behind said shoe and thereby prevent its projection, the shoulders 57 on the rearward extension 48 of said shoe will act as stops, engageable by the fingers 56 of the punch holder 36, to prevent projection of said punch holder and the punches 37 and 38. Thus, there will not occur repeated marking and pounding of a cap in the marking position by the punches 37 and 38 even though the cam 33 may continue to act to retract said punch holder and the spring 41 may continue to attempt to project the same.

If desired, means may be provided to direct one or more air blasts downwardly against caps in the chute 12 to assist gravity in feeding the caps through said chute, thus to increase the speed of operation of the marking mechanism. In this connection and as illustrated in the drawings, the housing 17 is provided with two downwardly and rearwardly inclined air ducts 73 and 74 which open through the rear of said housing into the cap chute 12, one at a point above the pin 34 so that air issuing therefrom assists gravity in urging the caps downwardly toward said pin, and the other at a point above the shoe 35 so that air issuing therefrom assists gravity in urging the marked caps downwardly from the marking position when said shoe is retracted. Pipes 75 are connected to any suitable source of supply of compressed air and to said ducts 73 and 74 for the delivery of compressed air to the latter; and in this connection the air delivery may either be constant or intermittent under the control of suitable valve means, as desired.

Preferably, but not necessarily, guide flanges 76 are provided at the rear of the housing 17 to laterally position the caps a centrally relative to the punches 37 and 38 as the caps move downwardly through the cap chute 12 to the marking position. These flanges are laterally spaced apart, project into the cap chute 12 and have the upper portions of their inner faces inclined downwardly and inwardly as indicated at 77 so that as the caps a move downwardly between them the caps are centralized with respect to the punches 37 and 38. Said flanges may be formed from any suitable hard, wear resisting material and may be carried either directly by the rear wall of the housing 17, or, as shown, by a rear cover plate 78 separate from said housing and fastened against the rear face thereof by, for example, screws 79.

From the foregoing description considered in connection with the accompanying drawings, it is believed that the construction and operation of the present cap marking mechanism will be clearly understood and its advantages appreciated. It is desired to point out, however, that while only a single specific embodiment of said mechanism has been illustrated and described, the same is readily susceptible of various modifications within the spirit and scope of the invention as defined in the appended claims.

We claim:

1. In a container capping machine having a cap feed chute, a pin and a shoe, a rocker arm directly interconnecting said pin and said shoe and effective by rocking movement thereof to project and retract said pin and shoe alternately with respect to each other and axially into and from said chute to temporarily arrest and release each cap fed through said chute, and cooperating cam and spring means for rocking said rocker arm.

2. In a container capping machine having a cap feed chute, a pin and a shoe, a rocker arm connected to said pin and said shoe and effective by rocking movement thereof to alternately project and retract said pin and shoe into and from said chute to temporarily arrest and release each cap fed through said chute, cooperating cam and spring means for rocking said rocker arm, and means for marking each cap while it is temporarily arrested, said pin having a lost motion connection with said rocker arm to permit said pin to remain retracted during rocking of said rocker arm in the event there should be an obstruction in the feed chute interfering with projection of said pin.

3. In a container capping machine having a cap feed chute, a shoe projectable into and retractable from said chute to temporarily arrest and release each cap fed through said chute, means projectable into and retractable from said chute for marking each cap while it is temporarily arrested, means for actuating said shoe and said marking means, and cooperating stop means on said shoe and said marking means whereby said shoe prevents projection of said marking means in the event said shoe is held against projection into said cap chute by an obstruction therein.

4. In a container capping machine having a cap feed chute, a pin and a shoe having fixed positions both laterally and vertically relative to said chute, and means for projecting and retracting said pin and said shoe alternately with respect to each other and axially into and from said chute to temporarily arrest and release each cap fed through said chute.

5. In a container capping machine having a cap feed chute, a pin and a shoe, the former disposed above and spaced from the latter and each disposed substantially perpendicularly relative to said chute and longitudinally projectable and retractable into and from said chute, said pin and shoe each having a fixed position both laterally and vertically relative to said chute, and means for projecting and retracting said pin and shoe alternately with respect to each other into and from said chute to temporarily arrest for marking and then to release each cap fed through said chute.

6. In a container capping machine having a cap feed chute, a pin and a shoe, the former disposed above and spaced from the latter and each disposed substantially perpendicularly relative to said chute and longitudinally projectable and retractable into and from said chute, said pin and shoe each having a fixed position both laterally and vertically relative to said chute, a rocker arm directly interconnecting said pin and shoe and effective by rocking movement thereof to project and retract said pin and shoe alternately with respect to each other into and from said chute to temporarily arrest for marking and then to release each cap fed through said chute, and means for rocking said rocker arm.

7. In a container capping machine having a cap feed chute, a pin and a shoe, the former disposed above and spaced from the latter and each disposed substantially perpendicularly relative to said chute and longitudinally projectable and retractable into and from said chute, said pin and shoe each having a fixed position both laterally and vertically relative to said chute, a rocker arm directly interconnecting said pin and shoe and effective by rocking movement thereof to project and retract said pin and shoe alternately with respect to each other into and from said chute to temporarily arrest for marking and then to release each cap fed through said chute, a cam follower carried by said rocker arm, a rotatable shaft extending transversely relative to said rocker arm, and means including a cam on said shaft cooperating directly with said cam follower to rock said rocker arm.

8. In a container capping machine having a cap feed chute, a pin and a shoe, the former disposed above and spaced from the latter and each disposed substantially perpendicularly relative to said chute and longitudinally projectable and retractable into and from said chute, said pin and shoe each having a fixed position both laterally and vertically relative to said chute, a rocker arm directly interconnecting said pin and shoe and effective by rocking movement thereof to project and retract said pin and shoe alternately with respect to each other into and from said chute to temporarily arrest for marking and then to release each cap fed through said chute, a cam follower carried by said rocker arm, a rotatable shaft extending transversely relative to said rocker arm, a cam on said shaft cooperating directly with said cam follower to rock said rocker arm in one direction, and spring means for rocking said rocker arm in the opposite direction.

9. In a container capping machine having a cap feed chute, a pin and a shoe, the former disposed above and spaced from the latter and each disposed substantially perpendicularly relative to said chute and longitudinally projectable and retractable into and from said chute, said pin and shoe each having a fixed position both laterally and vertically relative to said chute, a rocker arm directly interconnecting said pin and shoe and effective by rocking movement thereof to project and retract said pin and shoe alternately with respect to each other into and from said chute to temporarily arrest for marking and then to release each cap fed through said chute, and means for rocking said rocker arm, said pin having a lost-motion connection with said rocker arm to permit said pin to remain retracted during rocking of said rocker arm in the event of an obstruction in said chute interfering with projection of said pin.

10. In a container capping machine having a cap feed chute, a pin and a shoe, the former disposed above and spaced from the latter and each disposed substantially perpendicularly relative to said chute and longitudinally projectable and retractable into and from said chute, said pin and shoe each having a fixed position both laterally and vertically relative to said chute, a rocker arm directly interconnecting said pin and shoe and effective by rocking movement thereof to project and retract said pin and shoe alternately with respect to each other into and from said chute to temporarily arrest for marking and then to release each cap fed through said chute, a cam follower carried by said rocker arm, a rotatable shaft extending transversely relative to said rocker arm, and means including a cam on said shaft cooperating directly with said cam follower to rock said rocker arm.

11. In a container capping machine having a cap feed chute, a pin and a shoe, the former disposed above and spaced from the latter and each disposed substantially perpendicularly relative to said chute and longitudinally projectable and retractable into and from said chute, said pin and shoe each having a fixed position both laterally and vertically relative to said chute, a rocker arm directly interconnecting said pin and shoe and effective by rocking movement thereof to project and retract said pin and shoe alternately with respect to each other into and from said chute to temporarily arrest for marking and then to release each cap fed through said chute, a cam follower carried by said rocker arm, a rotatable shaft extending transversely relative to said rocker arm, a cam on said shaft cooperating directly with said cam follower to rock said rocker arm in one direction, and spring means for rocking said rocker arm in the opposite direction.

12. In a container capping machine having a cap feed chute, a pin and a shoe, the former disposed above and spaced from the latter and each disposed substantially perpendicularly relative to said chute and longitudinally projectable and retractable into and from said chute, said pin and shoe each having a fixed position both laterally and vertically relative to said chute, a rocker arm directly interconnecting said pin and shoe and effective by rocking movement thereof to project and retract said pin and shoe alternately with respect to each other into and from said chute to temporarily arrest for marking and then to release each cap fed through said chute, a cam follower carried by said rocker arm, a rotatable shaft extending transversely relative to said rocker arm, and means including a cam on said shaft cooperating directly with said cam follower to rock said rocker arm, said pin having a lost-motion connection with said rocker arm to permit said pin to remain retracted in the event of an obstruction in said chute interfering with projection of said pin.

13. In a container capping machine having a cap feed chute, means projectable into and retractable from said chute for marking caps fed through said chute, a cam follower carried by said marking means, a cam cooperating directly with said cam follower to retract said marking means, said cam having a step to suddenly release said marking means for projection, and spring means for projecting said marking means.

ALFRED G. WOOD.
CHARLES J. LAVAL.
JOHN CALLAGHAN.
EUGENE A. WAHL.
MAX A. GREULICH.
WILHELM BOEHL.

References Cited in the file of this patent
UNITED STATES PATENTS

| Number | Name | Date |
|--------|------|------|
| 483,958 | Godfrey | Oct. 4, 1892 |
| 1,069,356 | Tilden | Aug. 5, 1913 |
| 1,275,813 | Wilday | Aug. 13, 1918 |
| 2,179,269 | Ogden | Nov. 7, 1939 |
| 2,313,828 | Lehmann | Mar. 16, 1943 |
| 2,369,172 | Nordquist | Feb. 13, 1945 |
| 2,429,496 | Sutter | Oct. 21, 1947 |
| 2,436,820 | Nordquist | Mar. 2, 1948 |
| 2,447,030 | Rosenlof | Aug. 17, 1948 |
| 2,462,590 | Albertoli | Feb. 22, 1949 |